Jan. 22, 1957  H. E. HAASE  2,778,176
WRAPPER CUTTING, GLUEING AND FEEDING APPARATUS
Filed May 18, 1953  11 Sheets-Sheet 6
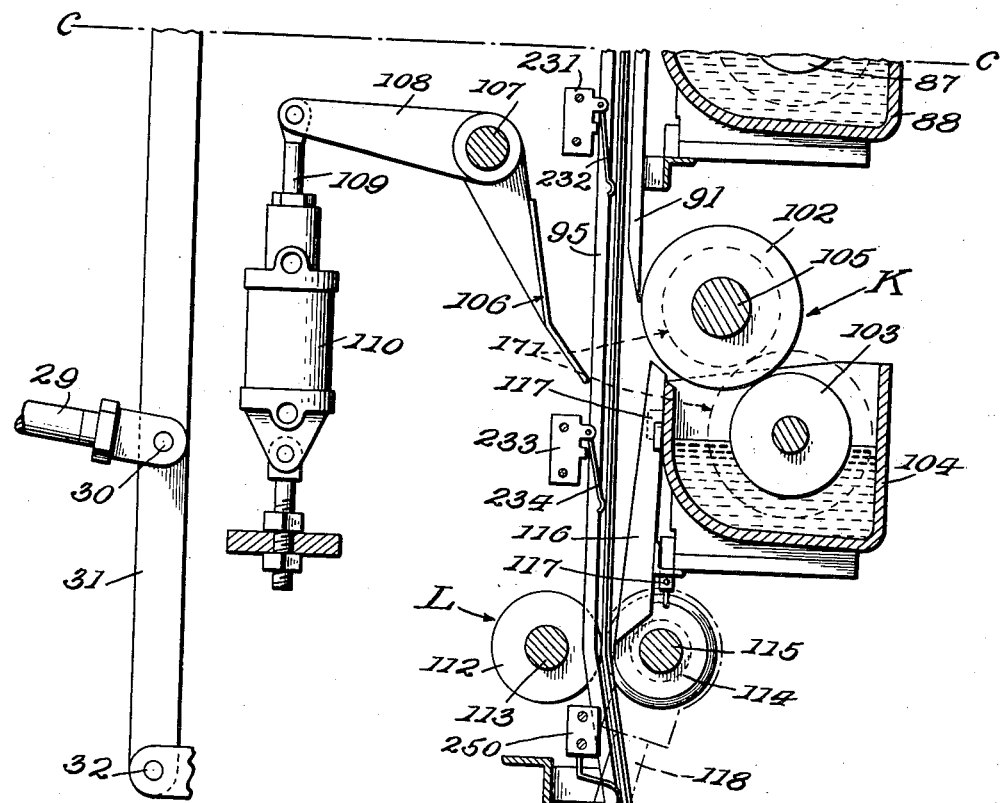
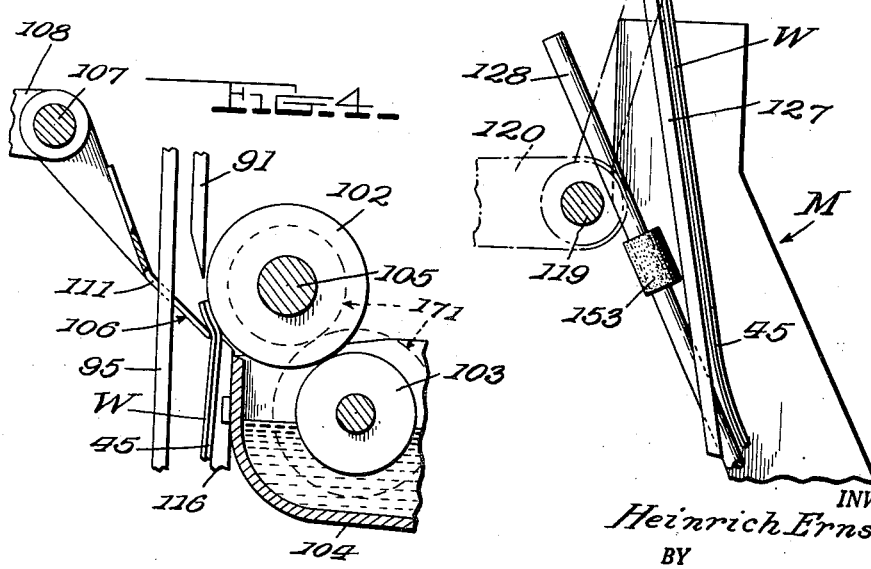
INVENTOR.
Heinrich Ernst Haase
BY
Mason, Porter, Diller & Stewart
attys

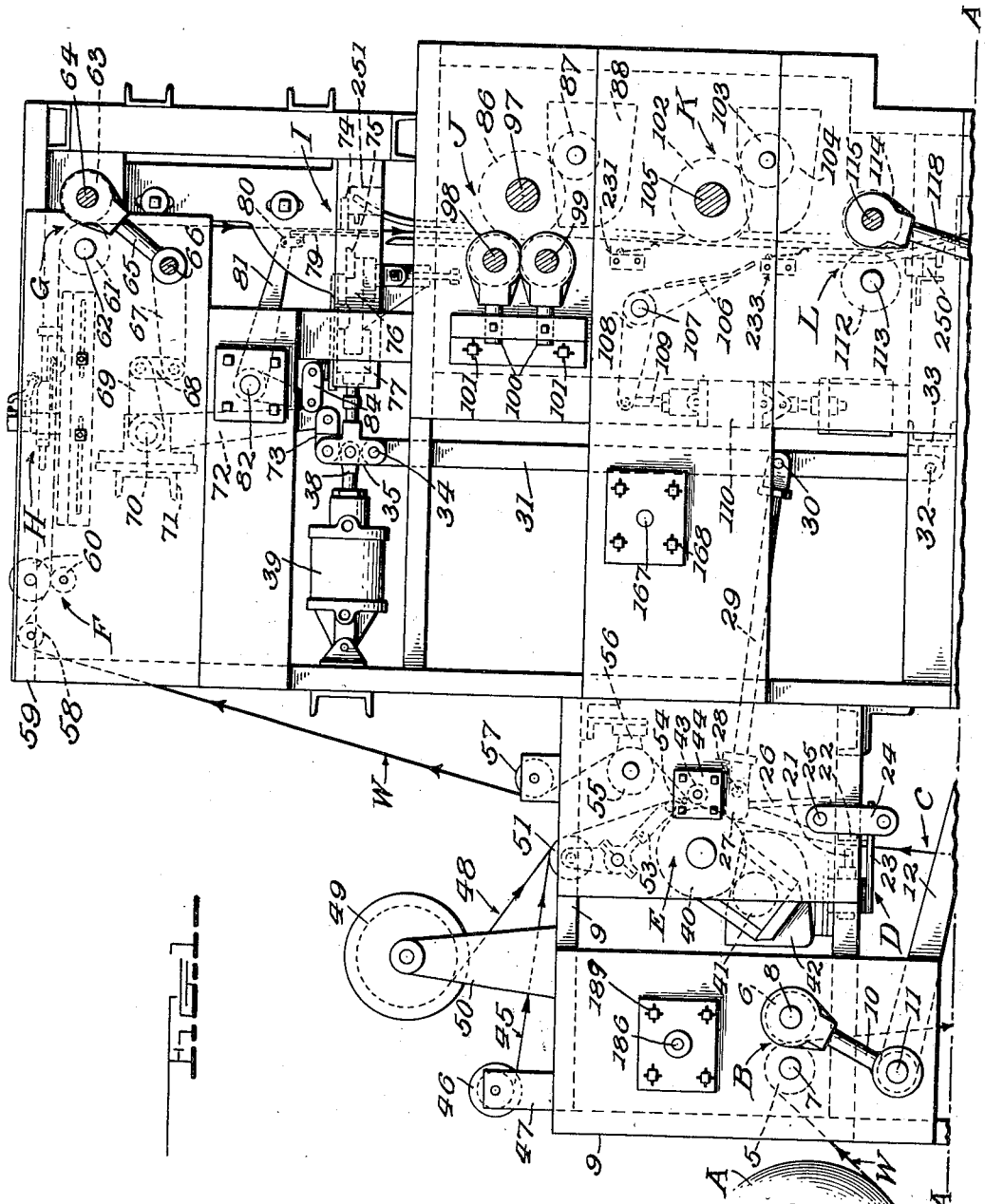

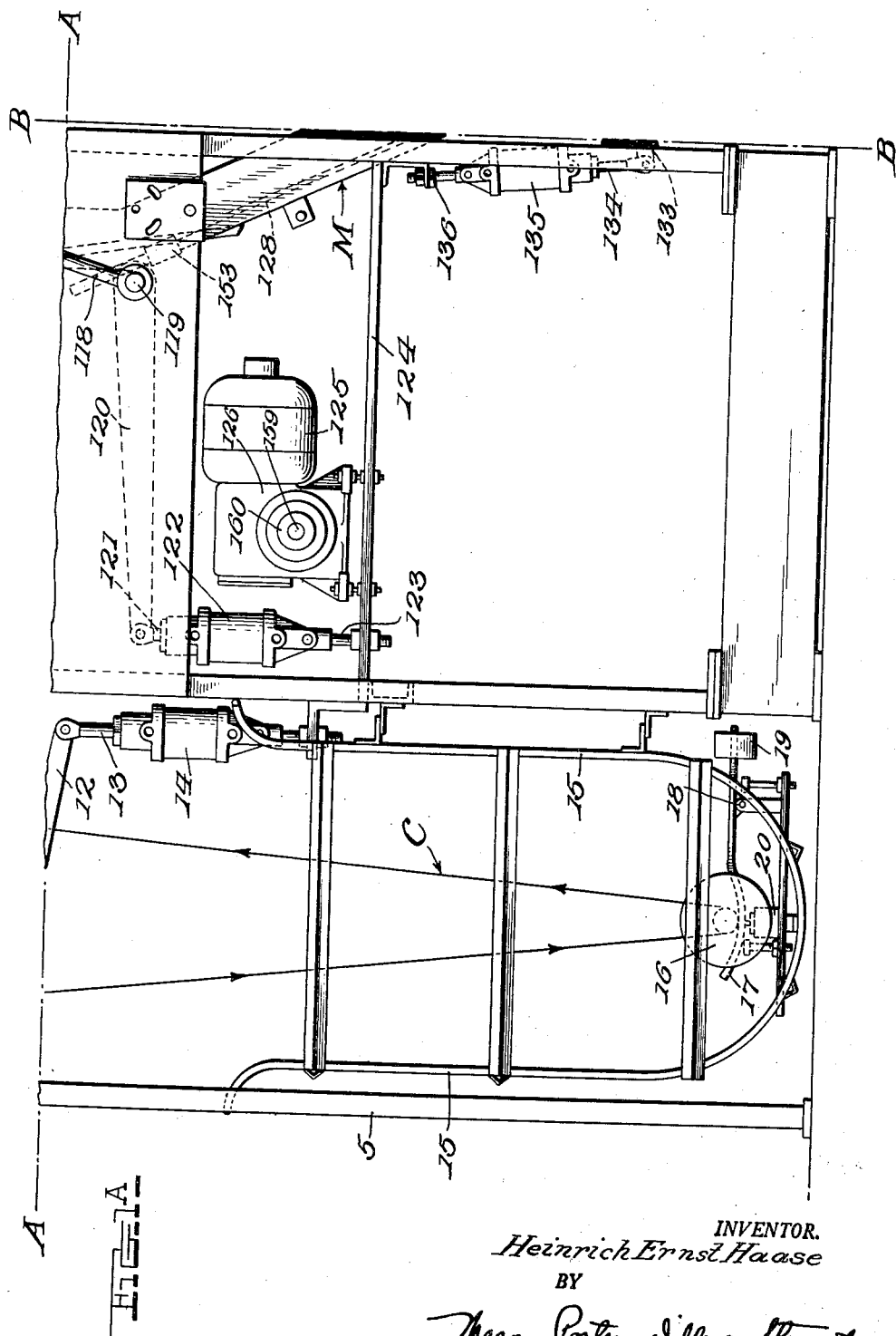

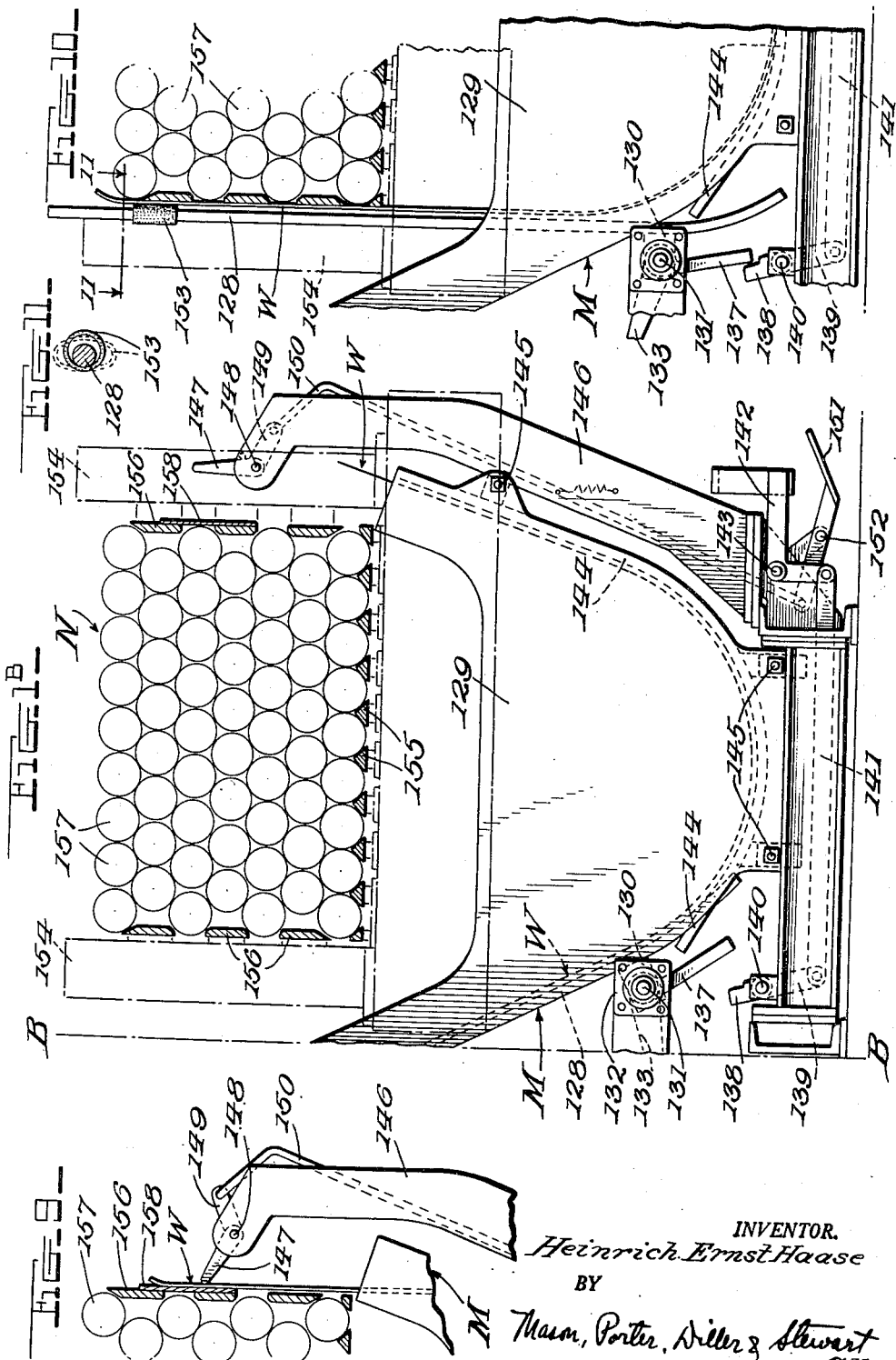

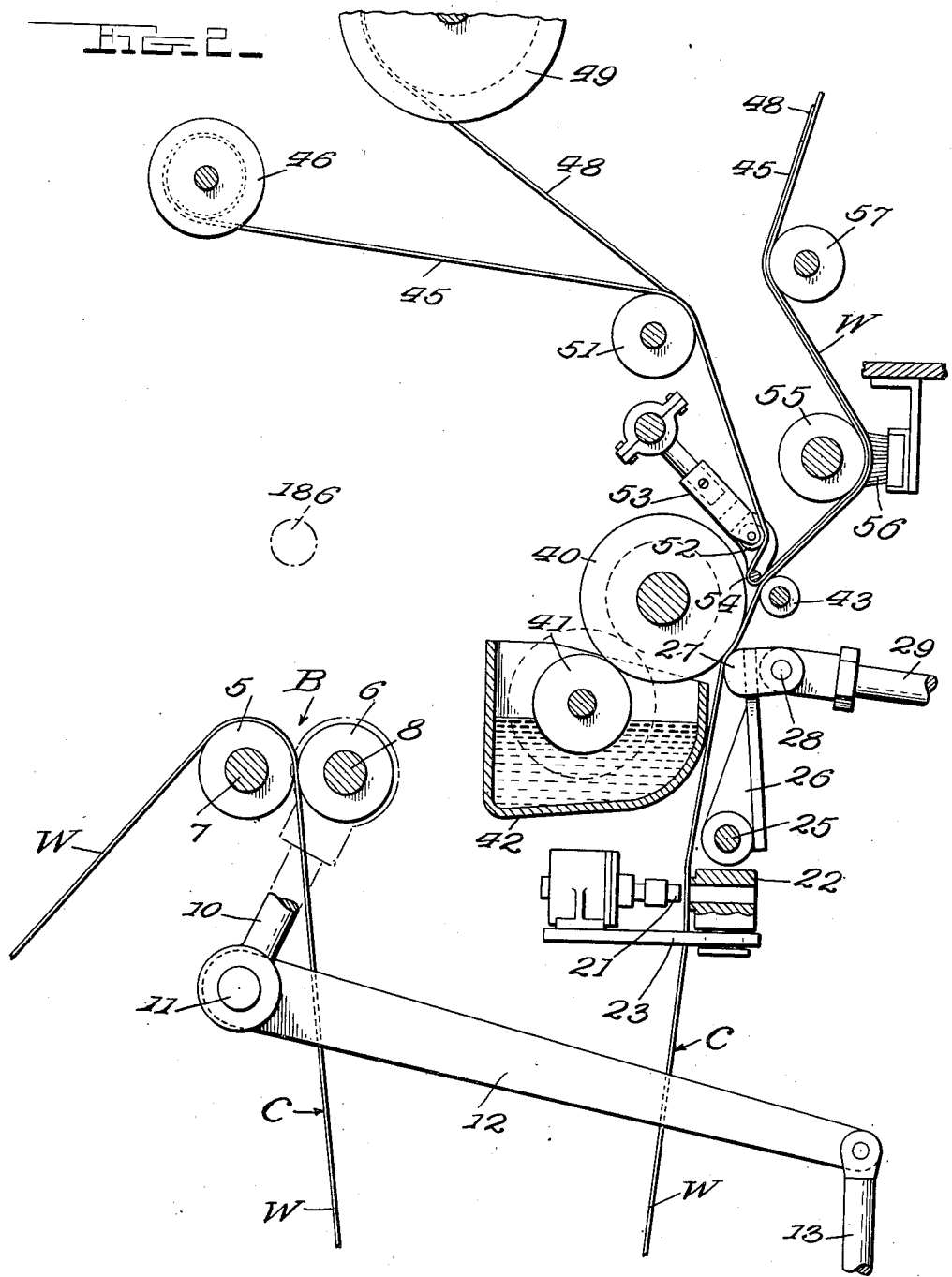

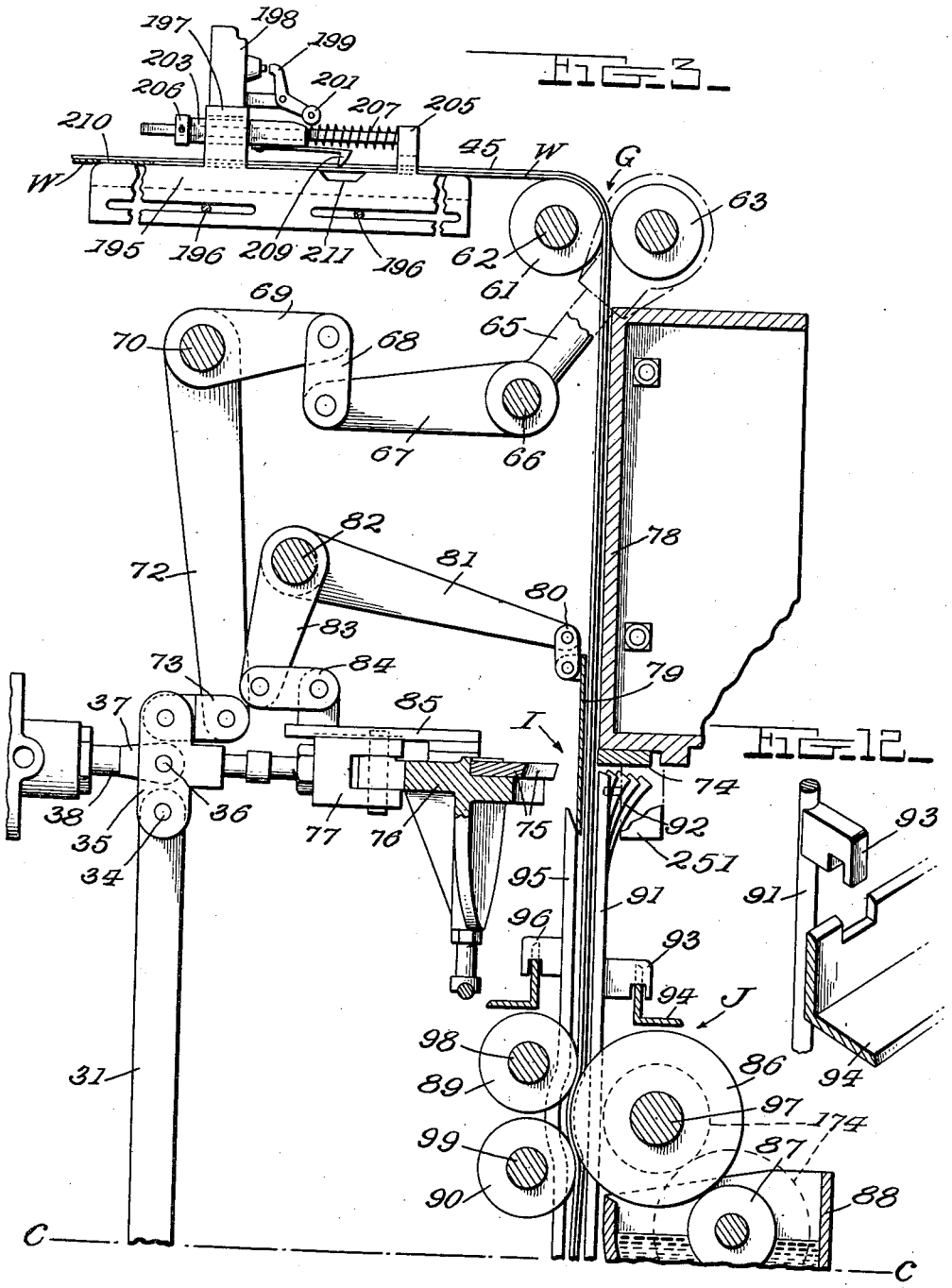

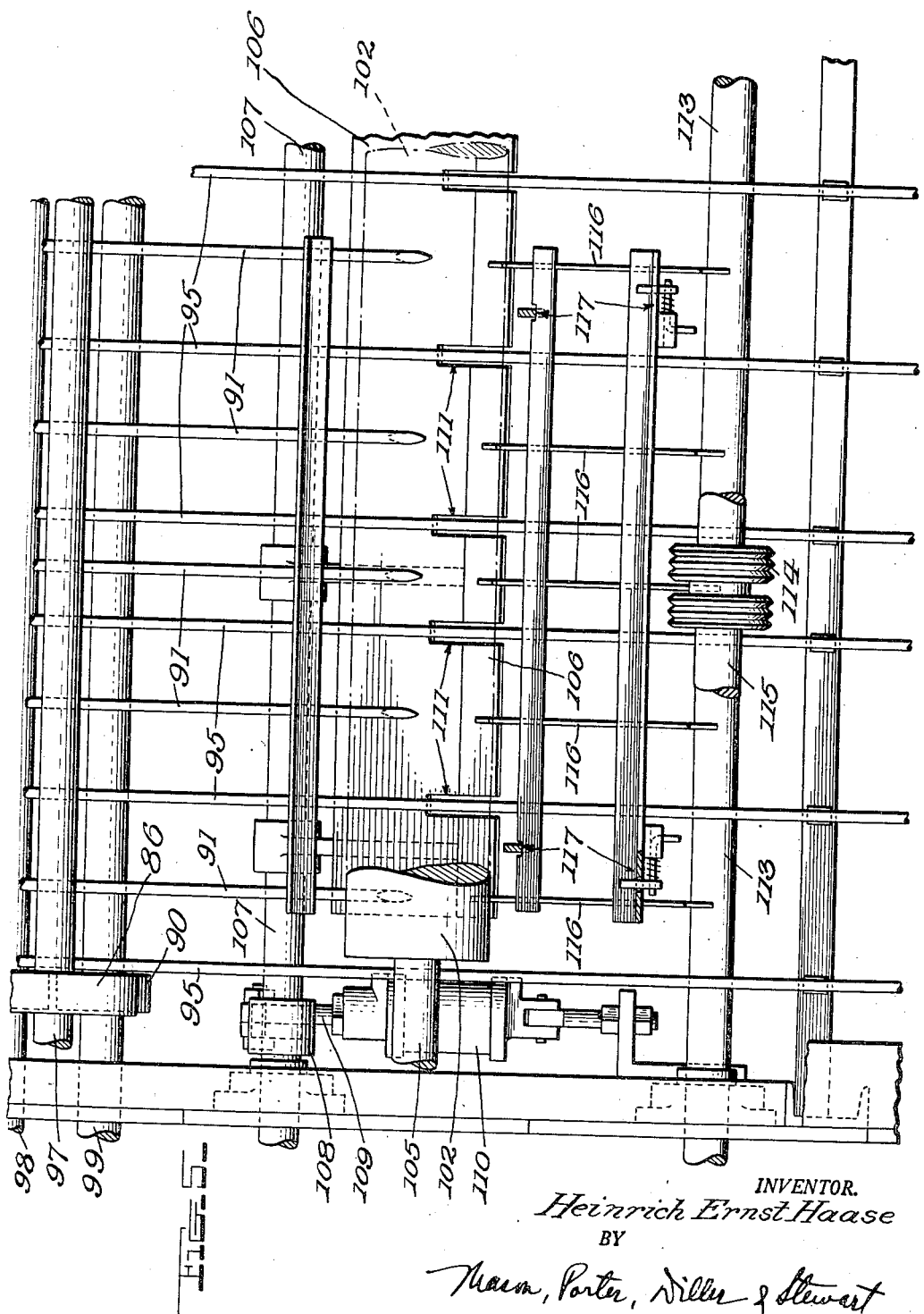

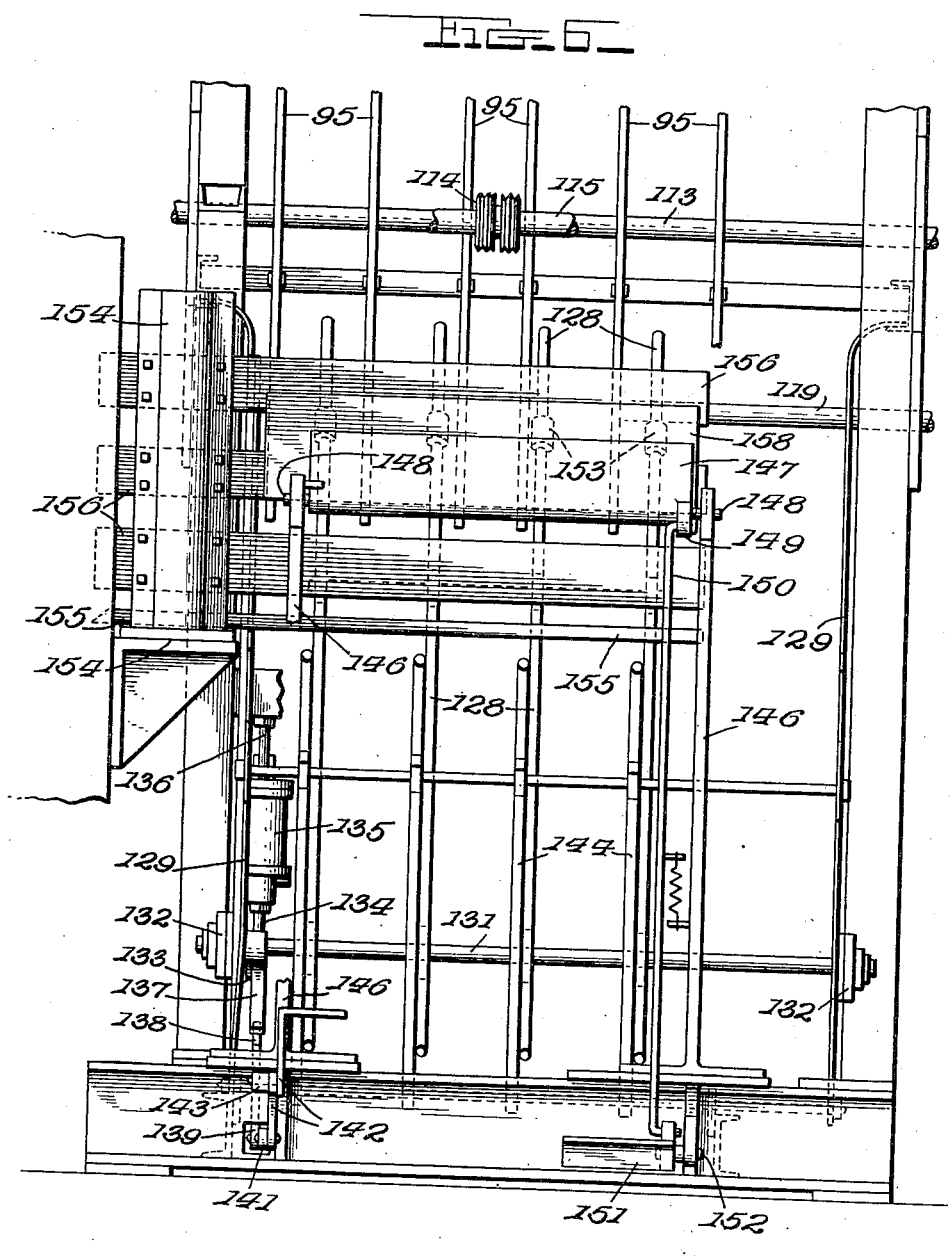

Jan. 22, 1957            H. E. HAASE            2,778,176
WRAPPER CUTTING, GLUEING AND FEEDING APPARATUS
Filed May 18, 1953
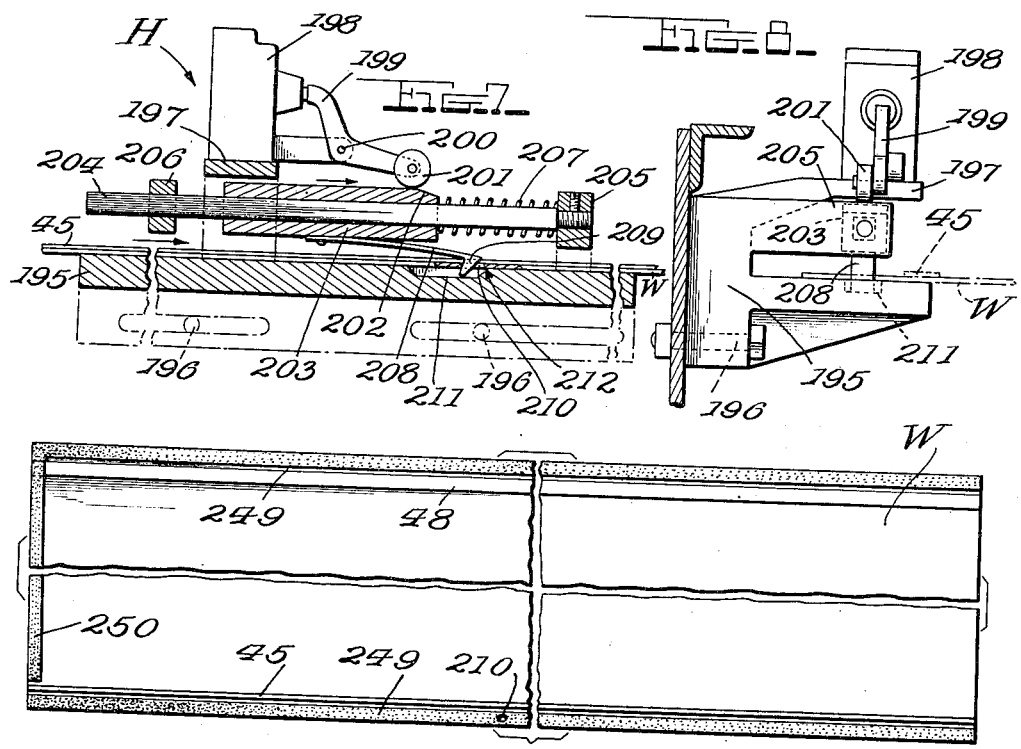
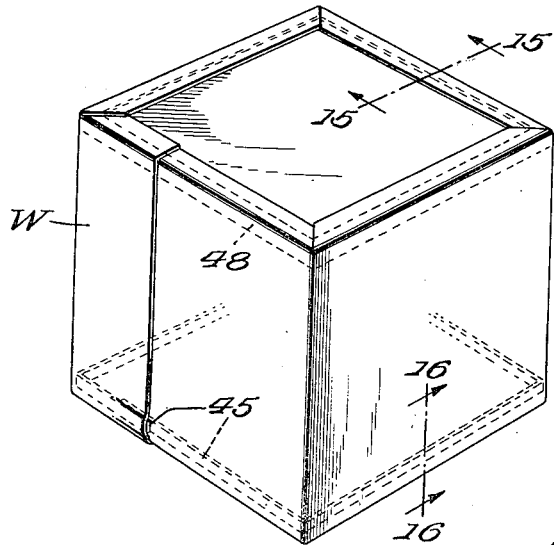
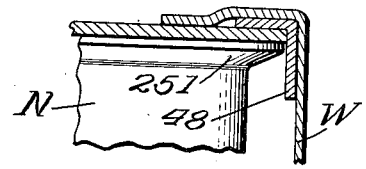
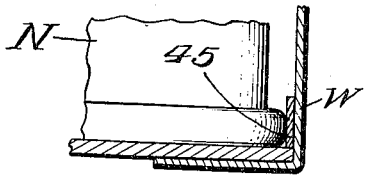
INVENTOR.
Heinrich Ernst Haase
BY
Mason, Porter, Diller & Stewart
attys.

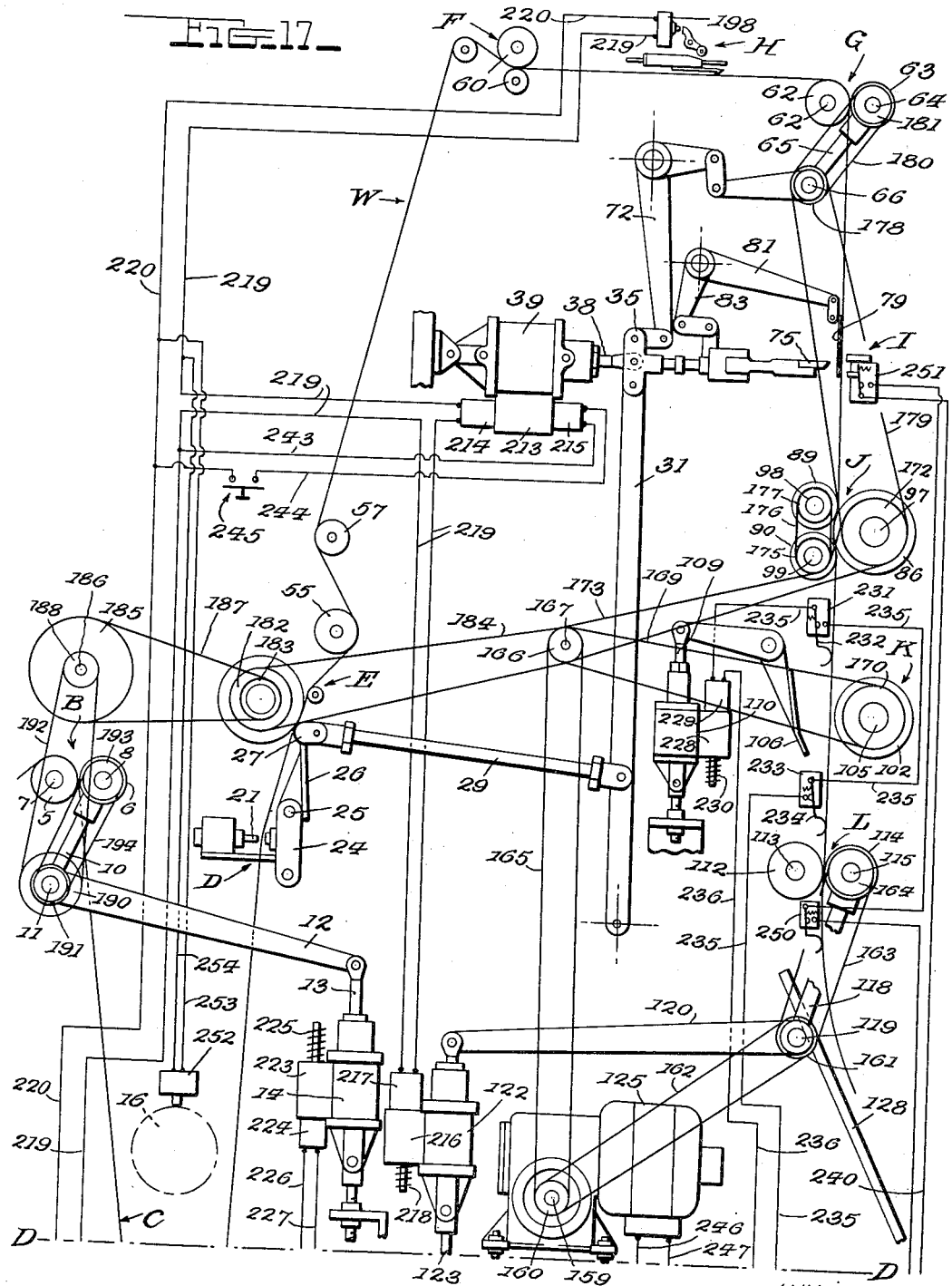

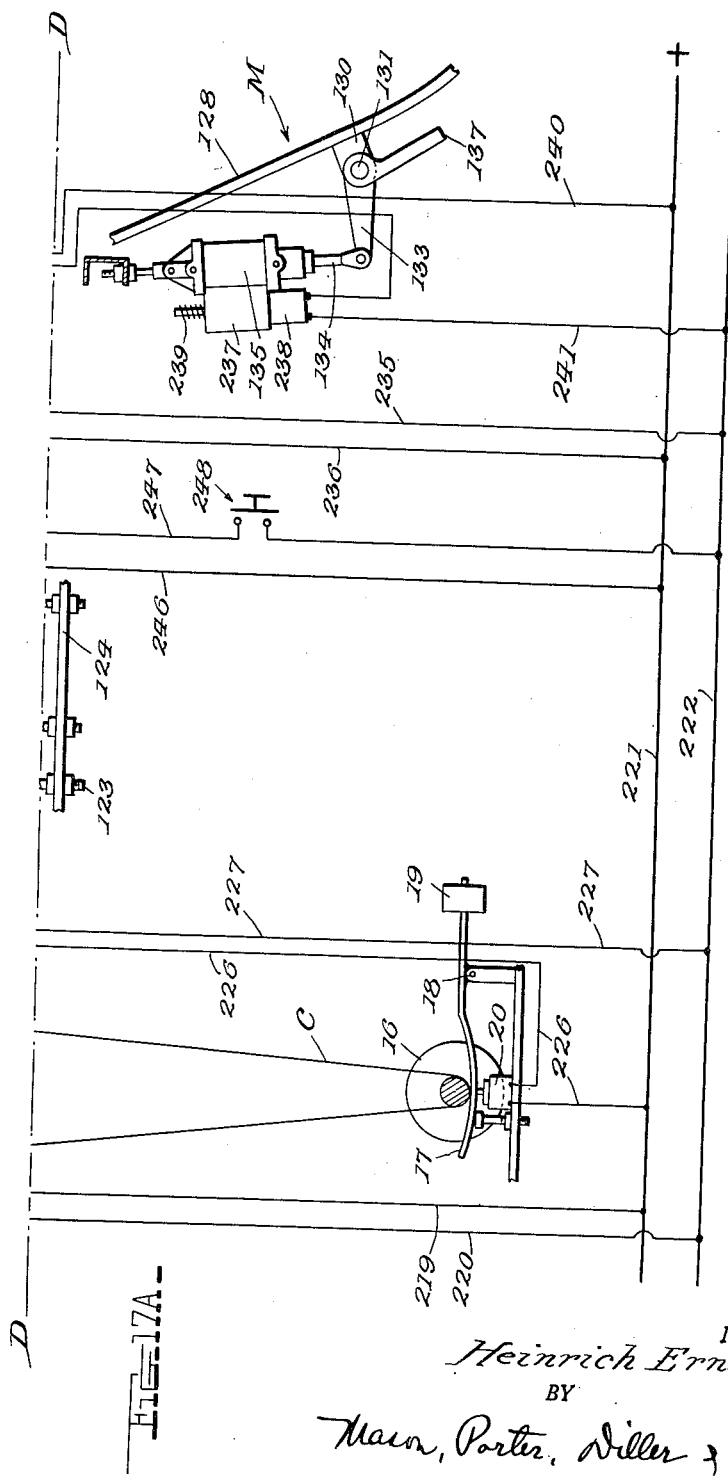

United States Patent Office 2,778,176
Patented Jan. 22, 1957

2,778,176

WRAPPER CUTTING, GLUING, AND FEEDING APPARATUS

Heinrich Ernst Haase, Chicago, Ill., assignor to Continental Can Company, Inc., New York, N. Y., a corporation of New York Application May 18, 1953, Serial No. 355,705

36 Claims. (Cl. 53—64)

The invention relates generally to the art of manufacturing cans and primarily seeks to provide a novel apparatus for cutting wrappers from a continuous web of paper, gluing the wrappers so that they can be properly sealed as a packaging means about an assembled grouping of cans, and feeding the cut and glued wrappers into position for being so sealed about said cans.

In the can manufacturing art great progress has been made in the production of efficiently operating body making and bottoming machinery, and cans are manufactured with great rapidity. The production of efficiently operating can handling methods and apparatus have not kept pace, and much wastage of time and labor is entailed in the handling of cans after they have been manufactured. It is commonly known that the labor cost of handling manufactured cans incidental to shipment and storage is greater than the labor cost incidental to the manufacturing of the cans. Much effort has been expended by workers in the art in attempts to develop handling methods and apparatus which will, to some extent at least, relieve this objectionable situation. One purpose has been to package groupings of cans in paper bags or wrappers. This greatly facilitated the handling, shipping and storage of cans, but there remains much room for improvement in the packaging of cans. When the can groupings have been packaged in preformed bags, loose packaging has been the result, and tearing and breakage has resulted because of the freedom of the packaged cans to move about in the encasing paper. In an effort to avoid this last named difficulty the cans have been arranged for packaging in staggered and nested row relation, thereby to provide smaller, tighter and more compact packages. This effort has been improved by the packaging of the can groupings in wrappers which could be drawn rather tightly about the grouped cans, and it is the purpose of the present invention to facilitate this form of packaging by providing for the practical formation and placement of wrappers in which to wrap and seal the can groupings.

An object of the invention is to provide a novel apparatus for drawing wrapper lengths from a continuous roll of paper, applying glue stripes along the marginal edges of the paper, cutting the paper thus drawn and glued into wrapper lengths, and applying glue along the trailing transverse edge of each said wrapper length.

Another object of the invention is to provide in apparatus of the character stated means for feeding the cut and glued wrappers into position for being sealed as a packaging means about assembled groupings of cans.

Another object of the invention is to provide in apparatus of the character stated means permitting variation in the length of wrappers prepared therein.

Another object of the invention is to provide an apparatus of the character stated wherein the wrapper length controlling means comprises an electric switch controlled wrapper length severing means, and paper web punching means for punching control holes in the web a predetermined definite distance from the web severing means and effective to control operation of the switch, said switch being placeable at variable distances from the web severing means and said web punching means.

Another object of the invention is to provide an apparatus of the character stated in which are included feed roll means for feeding the paper web to the web severing means, means also being included under control of the electric switch for silencing said feed rolls and stopping the web feed just prior to each severing of a wrapper length from the web.

Another object of the invention is to provide an apparatus of the character stated including means for attaching a tear strip to the web prior to the cutting thereof into wrapper lengths and in position for being used in tearing open a wrapped package of cans.

Another object of the invention is to provide an apparatus of the character stated including means for attaching a tear strip to the paper web as aforesaid, and also a reinforcing strip positioned so that it will be bent over the outwardly turned flanges of cans at one end of the package when a wrapper is sealed about a can grouping, thereby to assure that the can flanges will not cut through and form an objectionable opening in the can packaging wrapper.

Another object of the invention is to provide in apparatus of the character stated means for adhering to the paper web a portion only of the width of the reinforcing strip so that when said strip is bent over the can flanges the non-adhered portion can slip freely relative to the wrapper during such bending.

Another object of the invention is to provide in apparatus of the character stated means for applying to the paper web a tear strip, or a reinforcing strip, or both, which includes means for applying glue to the paper web and then pressing the strip or strips against the glue in close proximity to the place at which the glue is applied so that there will be only a short length of glue striping that can harden upon stoppage of the web feeding, thereby to avoid interference with efficient adhering of the strip or strips to the web when operation is again started.

Another object of the invention is to provide in apparatus of the character stated means for applying glue striping to the web in advance of the pressing of the strip or strips thereagainst, and means for pressing the web against the glue striping means while the web is being advanced and for relieving said pressure application and letting the web move away from the glue striping means whenever the advancing of the web is discontinued.

Another object of the invention is to provide in apparatus of the character stated punching means for punching the switch controlling holes in the web along marginal edge portions which are to be adhered in sealing the wrapper, and control means for operating the punch while the paper web is stationary.

Another object of the invention is to provide in apparatus of the character stated means for applying the marginal edge glue stripes including applicator roll means and guide roll means placed above and below the applicator roll means and to one side thereof so as to be effective to hold the paper web in arcuate contact with the applicator roll means and yet be out of position for contacting the applicator roll means when each cut wrapper length trailing edge clears said applicator roll means.

Another object of the invention is to provide in apparatus of the character stated novel means for guiding the leading edge of the paper web and the trailing edge of a cut wrapper at the position of and beyond the cutting station.

Another object of the invention is to provide guiding means of the character stated in which there is included a vertically shiftable plate and means for controlling the position thereof to place the same in guiding position while the web is being fed between the knives, and for moving the same, out of the path of the movable knife when the web feeding has stopped and a wrapper length forming cut is about to be made.

Another object of the invention is to provide an apparatus of the character stated in which the means for applying the stripe of glue along the trailing edge of a cut wrapper length comprises an applicator roll placed out of contacting relation to the travelling paper web, and a presser member movable in timed relation to the travelling paper to press the trailing edge of a cut wrapper length momentarily against said roll while it is moving therepast.

Another object of the invention is to provide control means for shifting the presser to and from its wrapper length end contacting and releasing positions including a micro-switch means controlled by said wrapper length end as it is approaching the applicator roll, and another micro-switch means controlled by said wrapper length end as it is moving away from said applicator roll.

Another object of the invention is to provide an apparatus of the character stated wherein the wrapper cutting knives, the marginal edge gluing means and the trailing edge gluing means all act on a portion of the wrapper paper while it is in vertical position, in which the paper guiding devices are disposed in a generally vertical position, and in which feed rolls for the vertically disposed paper portion are provided both above and below the knives and the several gluing means.

Another object of the invention is to provide an apparatus of the character stated wherein the feed roll means disposed below the several gluing means are separable only momentarily to allow the paper web to remain stationary during the punching of the web and the severing of each successive wrapper length therefrom, one said roll having a circumferentially serrated periphery engageable by each glued trailing edge of a wrapper as it is passing through the rolls.

Another object of the invention is to provide novel means for controlling the drawing off of the paper web from a roll in the form of a slack loop or festoon and including roll means between which the loop is suspended, draw roll means for drawing the paper web from the roll and into the loop, free weight means suspended in the loop, and control means for said draw roll means including a control switch actuated by said weight means as it is lifted and lowered by the loop and effective for silencing said draw rolls and discontinuing the drawing off of the paper web from the roll each time the loop reaches its predetermined length, and for again rendering the draw rolls effective to draw off additional paper web from the roll each time the loop becomes shorter than said predetermined length.

Another object of the invention is to provide an apparatus of the character stated in which the paper web feeding means includes separable feed rolls for feeding the web to the wrapper length severing means, and control devices for separating said rolls immediately in advance of each operation of said severing means, there being included also brake roll means through which the web is drawn by the feed rolls and which serve to hold the web stationary while the feed rolls are separated.

Another object of the invention is to provide an apparatus of the character stated in which the paper web passes from the festoon or slack loop through the brake rolls and thence through the feed rolls to the wrapper length severing means so that the brake rolls will assure against falling away of the slack loop as the feed rolls are separated just prior to the severing of a wrapper length.

Another object of the invention is to provide in apparatus of the character stated means for receiving a glued and severed wrapper and shape the same partially about a grouping of cans so that an operator can with facility complete the wrapping and sealing of the wrapper about said can grouping.

A further object of the invention is to provide a wrapper placing means of the character stated wherein there is included means for gripping the leading edge of the wrapper while the operator is grasping the trailing edge and drawing it over the grouping of cans and sealing it against said leading edge.

A still further object of the invention is to provide a wrapper placing means of the character stated including a cradle-like receiver having stationary and movable supports uprightly disposed and against which the trailing end of the wrappers may rest, and means to move the movable supports toward and then away from the can groupings to facilitate the placement of the wrappers therearound.

With the above and other objects in view that will hereinafter appear, the nature of the invention will be more clearly understood by reference to the following detailed description, the appended claims and the several views illustrated in the accompanying drawings.

In the drawings:

Figures 1, 1A and 1B, when joined at the lines A—A and B—B respectively, together comprise a side elevation of the complete apparatus, a portion of a can grouping means also being shown in vertical cross section and dot and dash line phantom.

Figure 2 is an enlarged fragmentary vertical cross sectional view illustrating the means for applying the tear strip and the reinforcing strip to the paper web, and also the web punching means.

Figures 3 and 3A, when joined at the line C—C, together comprise an enlarged fragmentary vertical cross sectional view illustrating the upper and lower feed roll means for positioning and feeding the paper web vertically across the wrapper length severing knives, and also the means for applying the marginal edge or side stripes of glue, as well as the means for applying the transverse glue stripe across the trailing edge of a severed wrapper length.

Figure 4 is an enlarged fragmentary vertical cross sectional view illustrating the presser in the act of pressing the trailing end edge of a cut wrapper length against the applicator roll which applies the transverse glue stripe thereto.

Figure 5 is an enlarged fragmentary side elevation looking from right to left at structure shown in Figure 3A, parts being broken away and in section.

Figure 6 is a fragmentary side elevation looking from right to left at structure shown in Figure 1B.

Figure 7 is a detail vertical longitudinal section illustrating the adjustably mounted control switch which is actuated by punch hole contact to determine the length of wrapper which is to be cut.

Figure 8 is a right end elevation of the parts shown in Figure 7.

Figure 9 is a fragmentary vertical cross sectional view showing the treadle actuated clamp for the leading end of the wrapper moved from the out of the way position of Figure 1B to the active or clamping position.

Figure 10 is a view similar to Figure 9 illustrating the shiftable wrapper guiding and supporting devices shifted into position for placing the trailing edge of a wrapper where it can be readily grasped by an operator.

Figure 11 is a detail cross section taken on the line 11—11 on Figure 10.

Figure 12 is a fragmentary perspective view illustrating an optional manner of mounting one of the paper web guiding rods.

Figure 13 is a detail view illustrating one of the completed wrappers, parts being broken away.

Figure 14 is a perspective view illustrating a can package formed by use of a wrapper formed and assembled in the apparatus.

Figure 15 is an enlarged fragmentary vertical cross section taken on the line 15—15 on Figure 14.

Figure 16 is an enlarged fragmentary vertical cross section taken on the line 16—16 on Figure 14.

Figures 17 and 17A when joined at the lines D—D together comprise a diagrammatic view illustrating the manner of driving the various shafts and rolls included in the apparatus, and also electrical and pressure cylinder controls.

In the novel apparatus herein disclosed as an example of an embodiment of the invention, the paper web W is drawn from a suitably supported roll A by draw roll means generally designated B and which form part of a supporting and guiding means for suspending a portion of the web in the form of a slack loop or festoon C. See Figures 1, 1A and 1B.

At the delivery end of the festoon, the web passes through a web punching station D and a reinforcing tape and tear strip applying station E. A reinforcing tape or a tear strip or both the strip and the tape may be adhesively attached to the web at the station E, and the purpose of these supplementary parts will be described in detail hereinafter.

After leaving the station E the web passes through a brake roll means F and upper feed roll means G which place a portion of the web in horizontal position and draw it past the control switch means generally designated H and which serves the purpose of controlling certain operations on the web which are to be described in detail hereinafter.

At the upper feed roll means G the web turns downwardly and passes through the wrapper severing station I where it is cut into individual wrappers of predetermined length, and thereafter said web passes through the glue striping station J where glue stripes are applied to the side or marginal edges thereof. Below or beyond the side striping station J, the web passes through the station K at which a glue stripe is applied transversely against each trailing end provided by the severing of the wrapper lengths at the station I. Immediately beneath the trailing end stripe applying station K the web passes through the lower feed roll means L and then is received in a cradle-like receiver M in which it is held in position for being applied with facility about a grouping of cans in the manner indicated in Figures 1B, 9 and 10.

The draw roll means B comprises a steel idler roll 5 and a continuously driven rubber draw roll 6. The rolls 5 and 6 are supported on shafts 7 and 8 respectively, the former being rotatably supported in suitable bearings on a frame extension 9, and the latter being carried in bearings on arms 10 which are mounted on the frame extension to be rockable about the center 11 by a connected crank arm 12. The arm 12 is in turn connected at its free end to the reciprocable plunger 13 of an actuator cylinder 14 which is suitably supported on the framing, and it will be apparent that as the cylinder plunger 13 is reciprocated, the arm 12 will first be lowered to move the continuously driven draw roll 6 away from the roll 5 to discontinue the drawing of the web from the roll A, and then be raised to replace the roll 6 in position for again cooperating with the roll 5 in drawing the web from the supply roll A.

It will be apparent by reference to Figure 1A that the lower end of the slack loop C is suspended within a protective cage 15 and carries a free spool-like weight 16. The weight 16 is engageable with the free end of a switch actuator 17 which is pivoted intermediately of its ends at 18 and equipped with a counter-poise 19 effective when the actuator is not contacted by the weight 16 to hold the free end of the actuator 17 in an elevated position out of contact with the underlying actuator button of the control switch 20 which serves to control the web drawing function of the rolls 5 and 6 in a manner to be described in greater detail hereinafter.

At the punching station D the web passes between a fixed punch 21 and a shiftable die 22, the latter being slidable along a support 23 with its opening in axial alignment with the punch. See Figures 1 and 2. The die 22 is suitably connected to be movable with an actuator arm 24 which is pivoted at 25 on the frame extension and connected to move with a member 26 having a web presser 27 thereon and being pivotally connected at 28 with one end of a thrust link member 29. The member 29 is pivotally connected at its other end as at 30 with an upright actuator bar 31 which is pivotally supported at its lower end as at 32 on a frame member 33 and pivotally connected at 34 at its upper end to an actuator member 35. The actuator member 35 is in turn pivotally connected at 36 intermediately of its ends to an actuator head 37 fixed on the plunger 38 of a horizontally disposed actuator cylinder 39 which is supported on the machine framing. See Figures 1 and 3. The cylinder 39 serves a number of purposes. Through the connections just described it operates the web punching mechanism in suitably timed relation to the feeding of the web, and also serves to move the presser 27 into and out of contact with the web for placing the same with relation to the glue applicator means E in a manner to be described hereinafter. This cylinder also acts through other connections to be described herein for controlling the operation of the upper feed roll means G, the wrapper severing means I, and also certain web guiding devices.

At the glue stripe applying station E there is provided a continuously driven shaft whereon the applicator roll means 40 is mounted. If a tear strip only is to be applied to the web, only one applicator roll would be provided, and the same would be true if only a reinforcing tape were to be applied. However, if both the strip and the tape are to be applied, two applicator rolls would be carried by the continuously driven shaft in proper spaced relation. The roll or rolls 40 are engaged by pick-up roll means 41 immersed in the usual manner in glue in the pot 42 which is suitably supported on the frame extension. It will be apparent by reference to Figures 1 and 2 of the drawings that the applicator roll means 40 is disposed opposite a guide roll idler 43 which is supported at 44 on the frame extension. A tear strip 45 is supplied from a roll 46 supported as at 47 on the frame extension, and a reinforcing tape 48 is supplied from a roll 49 supported as at 50 on said frame extension, both the strip and the tape passing over idler roll means 51 and over guide roll means 52 carried on adjustably mounted arm supporting means 53. The arm 53 also carries a small diameter presser roll means 54 under which the strip and tape pass and by which they are applied or pressed against the glue stripes which are applied to the web by the applicator rolls 40. It will be noted that the presser roll 54 guides the strip and tape and presses them against the web as it is passing over the guide roll means 43, and the roll 54 is positioned close to but out of contact with the periphery of the applicator roll means 40. In this manner the strip and tape will not directly contact the applicator roll means but will be pressed against above glue stripes applied by said roll means to the web W. It will also be noted that while the glue stripes are being applied to the web W, the web will be held in arcuate contact against the applicator rolls 40 by the presser 27 at a point close to the point at which the strip and tape are pressed against the web by the presser roll 54. Whenever the feeding of the web W is discontinued in a manner to be described hereinafter, the presser 27 will be retracted so as to permit the guided web W to move away out of contact with the stripe applying rolls 40. Because of the placement of the presser roll 54 in the particular manner described, there will be little or no glue striping in advance of the adhered portion of the strip and tape 45 and 48 on the web which could harden at each stoppage of the web feeding and interfere with the subsequent adhering of the strip and tape to the web after the feeding of the web is resumed.

After leaving the idler roll 43, the composite web passes over a suitably supported idler roll means 55 where it is pressed by a brush means 56 in the manner illustrated in Figures 1 and 2 to assure smooth and uniform adherence of the strip and tape to the web. After leaving the idler roll means 55, the web passes upwardly over another idler roll means 57 and again upwardly and over another idler roll means 58 suitably supported on the upper extension portion 59 of the framing. After passing over the idler roll 58, the web passes between idler brake roll means 60, and then through the upper feed roll means G comprising the steel idler 61 on the shaft 62 suitably supported in bearings on the frame extension 59 and the continuously driven rubber roll 63 which is supported on the shaft 64 rotatably mounted in bearings carried by the arms 65 which are removably mounted as at 66 on the framing. The rock shaft on which the arms 65 are mounted is crank connected at 67 with a link 68 which is in turn connected with the short arm 69 of a bell crank lever pivoted as at 70 on the frame piece 71 and having its depending long arm 72 link connected at 73 with the upper end of the previously described actuator member 35.

On its way down from the upper feed roll means G the web passes through the wrapper cutting station I at which the wrapper severing means are mounted. The wrapper severing devices include a fixed knife 74 which is supported on the machine framing in the manner clearly illustrated in Figures 1 and 3, and a movable knife 75 which is supported on a carrier 76, the latter being connected at 77 to the before mentioned actuator 35. The frame piece 78 to which the fixed knife 74 is attached cooperates with a vertically reciprocable plate 79 in guiding the web to and through the wrapper severing station. The plate 79 extends across the space between the knives when they are apart as in Figure 3 and is link connected as at 80 to the free end of the long arm 81 of a bell crank lever which is pivotally supported at 82 on the framing. The bell crank lever has its depending short arm 83 link connected at 84 to a bracket piece 85 which is fixed on the movable knife carrier 76 so as to be movable therewith.

It will be apparent from the foregoing that each time the plunger 38 of the actuator cylinder 39 is projected or moved to the right as illustrated in Figures 1 and 3 of the drawings, the die 22 of the punching mechanism will be moved to the left to cooperate with the punch 21 in punching a hole in the web W, the presser 27 will be moved to the right to free the web of its glue striping contact with the applicator roll means 40, the arms 65 carrying the upper feed roll 63 will be moved in a clockwise direction to separate the upper feed roll means G and discontinue the feeding of the web, the bell crank arms 81 will be lifted to move the guide plate upwardly out of its guiding position across the path of the movable knife 75, and the knife 75 will be moved to the right to sever a wrapper length from the web. It should be understood that the connecting linkage which imparts movement to the various devices from the actuator plunger 38 is so constructed and arranged that the displacement of said roll 63 from its web feeding position precedes the actuation of the punch means, and that the lifting of the guide plate 79 precedes the engagement of the movable cutting blade 75 with the web. It should also be understood that the several parts shifted by movement of the actuator plunger 38 to the right will be replaced to their normal positions when the action of the cylinder 39 is reversed to retract said plunger. The actuation of the cylinder to project the plunger 38 to the right takes place automatically, and retraction of the plunger is effected manually in a manner to be described in detail hereinafter.

The glue striping means at the station J comprises a continuously driven applicator roll means 86 which is engaged by pick-up roll means 87 immersed in the glue pot 88 supported in suitable manner on the machine framing. Upper and lower presser rolls 89 and 90 are provided opposite the applicator rolls 86, and it will be observed by reference to Figure 3 that the upper presser roll means is disposed above the center of the applicator roll means 86 and that the presser roll means 90 is similarly positioned below the center of the applicator roll means 86. It will also be noted that the presser roll means 89 and 90 are to one side of the applicator roll means 86 so as to be effective to guide the web in arcuate contact with the applicator roll means 86, and yet be positioned so as to be clear of contact with said applicator roll means when there is no paper web portion W lying between said applicator roll means 86 and the presser roll means 89 and 90. In this manner the desired pressing of the paper web against the applicator roll means is assured without any danger of gumming up the presser roll means.

The vertically reciprocable plate 79 and the frame plate portion 78 serve to suitably guide the composite web above the wrapper severing station I, and suitable means also is provided for guiding the web and wrapper length portions below said severing station. The lower guiding means comprises inner guides 91 which are progressively bent at 92 at their upper ends so as to clear the movable knife 75 as it engages in shearing contact with the stationary knife 74, and the guides 91 may be mounted as at 93 on suitable supporting rail means 94. The guides 91 cooperate with outer guides 95 which may be similarly mounted at 96.

The applicator roll means 86 is mounted on a suitably supported shaft 97, and the upper and lower presser roll means 89 and 90 are mounted on upper and lower shafts 98 and 99 which are also suitably supported on the machine framing, and all of said shafts 97, 98 and 99 are continuously driven in a manner to be described hereinafter. The bearings for the shafts 98 and 99 may be after. adjustably mounted at 100 and 101 so that accurate adjustment of the relation of the presser roll means 89 and 90 with the applicator roll means 86 can be effected. See Figures 1 and 3.

It will be apparent by reference to Figures 1, 3A and 5 of the drawings that while passing downwardly between the inner and outer guides 91 and 95, the web passes opposite but out of contact with the continuously driven transverse stripe applying roll means 102 at station K. The applicator roll 102 is engaged by a pick-up roll 103 immersed in glue in the pot 104 which is suitably supported on the framing, and said applicator roll is mounted on a shaft 105 which is continuously driven in a manner to be described hereinafter. A presser plate 106 is disposed opposite the applicator roll 102 and depends from a rock shaft 107 suitably supported on the framing and having a crank arm 108 extending therefrom and connected to the reciprocable plunger 109 of an actuator cylinder 110 suitably supported on the frame structure. It will be apparent by reference to Figures 4 and 5 of the drawings that the presser plate 106 is slotted at 111 to straddle the guides 95 when the plate is moved to the right as indicated in Figure 4 to press the trailing end of a severed wrapper length against the applicator roll 102. The movement of the plate 106 from its ineffective position shown in Figures 1 and 3A to its effective position shown in Figure 4 is brought about by operation of the actuator cylinder 110 in a manner to be described in detail hereinafter.

After leaving the transverse stripe applying station K, the web passes through the lower feed roll means L which comprises the idling steel roll 112 mounted on the shaft 113 suitably supported on the framing, and the constantly driven rubber feed roll 114 mounted on the shaft 115. The feed roll 114 is relatively narrow in width and has a periphery which is circumferentially serrated so that it will not be effective to objectionably pick up glue from the applied transverse stripe on the trailing end of each severed wrapper length. While passing to the lower feed rolls 112, 114 the web is guided by short, narrow edged guides 116 which are detachably mounted at 117 on the glue pot 104. These narrow guides provide suitable support or guiding of the trailing striped end edge portions of severed wrappers without objectionably withdrawing glue from the applied stripes.

The constantly driven roll shaft 115 is carried in bearings on the arms 118 which are mounted on a rock shaft 119 suitably supported on the framing, and a crank arm 120 extends from the shaft 119 and is connected to the vertically reciprocable plunger 121 of an actuator cylinder 122 mounted as at 123 on the frame support 124 whereon the main driving motor 125 also is mounted. The motor assembly 125 is equipped with suitable reduction gearing generally designated 126. See Figures 1^A and 3^A.

After passing through the lower feed roll means L, the successively severed wrapper lengths are fed into the receiver M best known in Figures 1^A, 1^B and 6, and for this purpose the lower ends of the guides 95 are bent at an angle at 127 to deliver the wrappers onto the upstanding guides 128 which are mounted between the end plates 129 of the receiver on pivotal mountings provided by the brackets 130 and the rock shaft 131. The shaft 131 is rockable in bearings 132, and a crank 133 projecting from said shaft is connected with the reciprocable plunger 134 of an actuator cylinder 135 supported as at 136 on the framing. Another crank 137 projects from the shaft 131 in position for being engaged by the upper end 138 of an upright actuator 139 which is pivotally mounted intermediately of its ends as at 140 on the frame. The lower end of the actuator 139 is link connected at 141 with the bell crank treadle 142 pivotally supported as at 143 on the frame. When the actuator cylinder 135 is actuated to retract or draw the plunger 134 upwardly it will serve to move the wrapper receiving guides 128 from their receiving position shown in Figures 1^A and 1^B to the upright position shown in Figure 10 in which position the crank 137 will be placed in position for being engageable by the actuator 138, 139 upon depressing of the treadle 142. Such depressing of the treadle will swing the guides 128 to the left a slight distance against the air pressure in the cylinder 135, just enough to relieve the pressure of the members 128 against the paper web so that when the operator grasps the wrapper to draw it over the can group and position it so as to form the side seam of the package, the top outside row of cans will not be disturbed by being the bearing for an excessive pull on the web such as would be necessary if the member 128 were not moved back slightly. The guides 128 are returned to their paper receiving position electrically in a manner to be described hereinafter.

The wrapper receiver also includes fixed guides 144 opposite the movable guides 128 and extending about the bottom of the receiver and fixedly supported in the manner indicated at 145. Upstanding frame pieces 146 are provided and a clamp wing 147 is journalled at its ends as at 148 on said frame piece so as to be swingable between the inactive position illustrated in Figure 1^B and the active or wrapper clamping position shown in Figure 9. A crank 149 extends from the wing 147 and is link connected at 150 to the treadle 151 pivotally supported as at 152 on the frame.

It is to be understood that as each severed wrapper length is delivered by the lower feed roll means L into the receiver M the advance end thereof will move upwardly in the receiver to the position illustrated at the right in Figure 1^B, in which position said advance or leading wrapper end may be readily grasped by the operator and pulled upwardly into position for being clamped by the clamp wing 147, and the trailing end of the wrapper length will be in position for being thrust forwardly with the movable guides 128 to the position shown in Figure 10 where it can be readily grasped by the operator and drawn over and about the assembled can grouping in effecting the desired wrapping of said can grouping. For this purpose the upper ends of the movable guides 128 may have grip rings 153 secured thereon for facilitating the holding of the trailing ends of the wrappers in the position shown in Figure 10.

One acceptable means for supporting the can groupings to be wrapped in the wrappers prepared in the improved apparatus is shown in Figures 1^B, 6, 9 and 10 and includes supporting means 154 from which spaced bottom rails 155 and side rails 156 extend. Within this U-shaped, slatted form the cans 157 are grouped in staggered and nested row relation in the manner clearly indicated in Figure 1^B. A side plate 158 may be provided against which to press and hold the leading end of the wrapper in the manner clearly illustrated in Figure 9.

The means for driving the various parts of the apparatus will now be described. On the reduced speed power out-put shaft 159 of the motor assembly 125 there is provided a double drive sprocket 160 which drives a double drive sprocket 161 mounted on the rock shaft 119 in counterclockwise direction through the chain 162, and a chain 163 from the sprocket 161 similarly drives the sprocket 164 secured on the feed roll shaft 115. A second chain 165 on the sprocket 160 drives the quadruple sprocket 166 on the jack shaft 167 which is adjustably mounted as at 168 on the framing.

A chain 169 passing over the sprocket 166 drives a sprocket 170 secured on the shaft 105 on which the trailing edge striper roll 102 is mounted, and the cooperating pick-up roll 103 is driven by the gear couple 171.

The side striping roll 86 is driven through the double sprocket 172 on its shaft 97 through the chain 173 which passes over the sprocket 172 and over the quadruple sprocket 166, and the cooperating pick-up roll 87 is driven through the gear couple 174. The upper flight of the chain 173 drives a double sprocket on the shaft 99, and a chain 176 passes over the sprocket 175 and over a sprocket 177 on the shaft 98 and thus serves to drive the upper and lower presser rolls 89 and 90. It will be apparent that the opposing surfaces of the rolls 86, 89 and 90 move in the same direction as the engaging surfaces of the paper web.

A double sprocket 178 is rotatable about the center of the rock shaft 66 of the upper feed roll means G and is driven by a chain 179 from the double sprocket 172 and a chain 180 taking about the sprocket 178 and a sprocket 181 on the feed roll shaft 64 drives said shaft and the feed roll thereon.

The shaft on which the rolls 40 which apply the glue stripes for adhering the strip 45 and tape 48 to the web W are mounted has two sprockets secured thereon, one 182 and one 183, the former 182 being driven by a chain 184 from the quadruple sprocket 166 and the latter 183 serving to drive the large sprocket 185 on the jack shaft 186 through the chain 187. The jack shaft 186 also is equipped with a small sprocket 188 and is adjustably supported as at 189 so that it can be adjusted in like manner as the previously mentioned jack shaft 167. It is to be understood that the pick-up roll 41 engageable with the applicator rolls 40 also may be driven by a gear couple with the shaft of the applicator rolls as in the case of the previously described glue stripers 86 at station J.

A double sprocket means is rotatable about the center of the rock shaft 11 of the draw roll means B, one portion of said sprocket means being a relatively large sprocket 190 and the other portion being a relatively small sprocket 191. The sprocket 190 is driven by a chain 192 from the sprocket 188 and the sprocket 191 drives the sprocket 193 on the draw roll shaft 8 through the chain 194. This reduced speed driving of the draw roll 8 assures a relatively slow starting and drawing of the paper from the heavy supply roll, and the time available between the successive cutting off of wrapper lengths is utilized in forming the slack festoon C.

One acceptable electrical control arrangement is shown diagrammatically in Figure 17. This diagrammatic example arrangement includes the control switch H shown in detail in Figures 3 and 7. This control means includes a longitudinal support which is longitudinally-adjustably mounted at 196 on the framing. A bracket 197 projects upwardly from the support 195 and a normally open switch 198 is supported on said bracket. It will be noted that the actuator button of the switch is presented for engagement by the actuator lever 199 which is pivotally supported as at 200 and carries a roller 201 at the free end thereof. The roller is engageable by the cam face 202 on the sleeve 203 which is longitudinally slidable on the guide 204 supported in the upstanding bracket 205 and having a stop collar 206 secured thereon. A compression spring 207 is interposed between the bracket 205 and the adjacent end of the sleeve 203 and constantly tends to hold the sleeve against the stop collar 206. A spring finger 208 is secured to the sleeve and extends downwardly therefrom and has a free end equipped with a cam nose 209 disposed to rest upon the portion of the paper web W which is fed over the longitudinal support 195 therebeneath, the cam nose portion of the finger constantly tending to drop into the punch holes 210 provided in said web in the manner clearly illustrated in Figure 7. In order to permit this dropping of the cam nose 209 into the punch holes the support 195 is provided in its upper surface with a recess 211 ending in a cam portion 212.

From the foregoing it will be apparent that each time one of the punch-formed holes 210 in the paper web W comes opposite, or beneath the cam nose 209 of the spring finger 208, said cam nose will drop into the hole and the web will draw the sleeve along with it against the action of the spring 207 and until the cam nose strikes and rides up on the cam end portion 212 of the recess. At this time the cam nose 209 will ride up onto the top of the support 195 and then out of the hole 210 in the relatively thin paper web W and onto the top surface of said web, at which time the spring 207 will force the sleeve back to its initial position against the stop collar 206. Prior to this lifting out of the cam nose 209 however, the sleeve cam 202 will have momentarily pressed the end of the lever 199 against the actuator button of the switch 198 to close said switch as shown in Figure 7 and complete the control circuit with which it is connected. This closing of the switch continues only momentarily and the switch is again opened as the sleeve is spring returned and the roller again rolls down off the sleeve cam portion 202. This switch action controls the cutting of the wrapper lengths from the paper web, among other control functions, and by varying the position of the switch the length of the wrappers can be determined at will. For this purpose the adjustable mounting of the switch at 196 can be utilized.

The actuator cylinder 39 has an air valve 213 thereon the shiftable valve in which is adapted to be shifted in one direction by a solenoid 214 to direct pressure fluid into one end of the cylinder to project its plunger 38, and to be shifted in the opposite direction by a solenoid 215 to direct pressure fluid into the opposite end of the cylinder to retract said plunger. Projection of the plunger first swings the bell crank arms 72 and 83 counterclockwise to move the feed roll 63 out of web feeding position and the guide plate 79 upwardly away from the knife 75, then continues to swing the arm 31 far enough to the right to actuate the punch means 22 and retract the web presser 27, and finally its movement to the right will be sufficient to cause the movable knife to engage the now stationary web W and shear a wrapper length therefrom. As soon as the feed roll 63 disengages the web W, movement of the web ceases because the lower feed roll means L also is similarly silenced in the manner described in detail hereinafter, and the brake roll means F serves to assure this desired prompt stopping of the web. Therefore, the web punching at the hole cutting station D, and the web or wrapper severing at the cutting station I take place while the paper web W is at rest. Retraction of the plunger 38 serves to return the several parts to their initial positions shown in Figure 1. Whereas projection of the plunger 38 is effected automatically under control of the switch 198 and the web holes 210, retraction of said plunger is manually controlled in a manner to be described hereinafter.

The actuator cylinder 122 which controls the lower feed roll means L has an air valve 216 thereon the valve in which is adapted to be shifted in one direction by a solenoid 217 to direct pressure fluid into one end of the cylinder to project the plunger 121 and bring about a separation or silencing of the feed roll 115, and in the opposite direction by spring means 218 to bring about a retraction of said plunger and restore the roll 114 to its initial, web feeding position shown in Figure 1.

The switch 198 and the solenoids 214 and 217 are connected in series by conductor lines 219 and 220 with the power lines 221 and 222, and in this manner it will be apparent that the solenoid 217 will be energized simultaneously with the energizing of the solenoid 214 so that the silencing or separation of the upper and lower feed roll means G and L will take place simultaneously. However, the returning of said upper and lower feed roll means to their feeding condition does not take place simultaneously. As soon as the switch 198 is opened after being momentarily closed as before described, the circuit through the conductor lines 219 and 220 is broken and the solenoid 217 is deenergized, allowing the spring means 218 to reverse the position of the air valve and bring about a retraction of the plunger 121 and a restoration to web feeding condition of the lower feed roll 114 immediately after the punch means 22, 21 and the knife 75 have completed the punching of the web and the cutting of a wrapper length from the web. This is necessary to continue the feeding of the severed wrapper. The restoration of the web feeding by the upper feed roll means G is accomplished manually, and therefore at the will of the operator.

The actuator cylinder 14 has an air valve 223 thereon the valve in which is adapted to be shiftable in one direction by a solenoid 224 to direct pressure fluid into one end of the cylinder to retract its plunger 13 and bring about a silencing of the draw roll means 5, 6 or in other words, a separation of the constantly driven roll 6 from the idler roll 5. A reversing of the air valve position is brought about by the spring means 225 each time the solenoid 224 is deenergized, and this causes a projection of the plunger 13 and a feed effecting reengagement of the feed roll 6. The solenoid 224 is connected in the control circuit with the weight actuated switch 20 through the conductor lines 226 and 227.

The actuator cylinder 110 has an air valve 228 thereon the valve in which is adapted to be shifted in one direction by a solenoid 229 for directing pressure fluid into one end of the cylinder to retract its plunger 109 and bring about a swinging of the presser plate 106 into position for pressing the trailing end of a severed wrapper length into contact with the applicator roll 102 as shown in Figure 4. This occurs when the solenoid 229 is energized, and when the solenoid is deenergized the spring means 230 is effective to reverse the air valve and bring about a projection of the plunger 109 and a retraction of the presser plate 106. In order to control this action there are provided an upper micro-switch 231 normally held open by contact of its lever 232 with the paper web W, and a lower micro-switch 233 which is normally held closed by its lever 234 contacting said web. See Figures 1, 3A and 17. The solenoid 229 is connected in series with the switches 231 and 233 through the conductor lines 235 and 236 with the power lines 221 and 222. Therefore, each time the trailing edge of a severed wrapper passes and releases the upper switch lever 232 it permits the switch 231 to close and complete the circuit through the switches 231 and 233 and the conductor lines 235 and 236 to energize the solenoid as aforesaid and project the presser member 106. When said trailing wrapper edge then passes and releases the lower switch lever 234 it permits said lever 234 to open the switch 233 and break the control circuit, deenergizing the solenoid 229 and allowing the spring 230 to shift the air valve and bring about a projection of the plunger 109 and retraction of the presser member 106. As the leading edge of the paper web W now approaches after resumption of the feeding thereof by restoration of the effective cooperation of the rolls 61 and 63, said edge will first displace the switch lever 232 and open the upper switch 231 and then displace the lever 234 and close the lower switch 233, or in other words restore the switches to the broken circuit, solenoid deenergizing condition diagrammatically illustrated in Figure 17.

The actuator cylinder 135 has an air valve 237 thereon the valve in which is adapted to be shifted in one direction by a solenoid 238 to direct pressure fluid into one end of the cylinder to retract the plunger 134 and cause the wrapper receiving and supporting members 128 to be swung over from the receiving position shown in Figures 17, 3A, 1A and 1B to the trailing end placing position shown in Figure 10 and previously described herein. The solenoid 238 may be connected with the power lines 221 and 222 through the lines 240 and 241 under control of inter-connecting micro-switches 250 and 251 connected in series. Switch 250 is located immediately below the lower feed rolls 112 and 114 and is normally held open by its arm contacting the paper web. Switch 251 is a limit switch located at the end of the cutting stroke of the web severing knife and is normally open when the knife is in its retracted position. When either switch is open the guides 128 will be in the retracted position as shown in Figure 17. When the knife 75 moves forward the switch 251 will be closed, thus establishing part of the circuit. Then when the trailing edge of the web W passes the switch 250 its arm will swing to the right and close this switch, completing the circuit and energizing solenoid 238 to swing the members 128 uprightly as aforesaid. Solenoid 238 will remain energized until the cutting knife is retracted and the limit switch 251 is opened, breaking the circuit, and the spring means 239 will shift the air valve to bring about a projection of the plunger 134 and a return or retraction of the members 128 to the receiving position shown in Figure 17.

Another and very important manual control is provided. The solenoid 215 connected with the actuator cylinder 39 is connected by conductor lines 243 and 244 with the power lines 221 and 222 through the conductor lines 219 and 220, a manually operable switch 245 being connected in the line 244. Thus the solenoid is energized by manual control to effect a retraction of the plunger 38 and the resultant reactivation of the upper feed roll means G, separation of the knives 74 and 75, lowering of the guide plate between the knives, replacement of the web presser 27 and separation of the web punching devices 22 and 21.

The motor assembly 125 is connected with the power lines 221 and 222 through the conductor lines 246 and 247 and is under control of a manually operable switch 248.

The several adhesive applicator devices E, J and K are continuously driven and this is advantageous because by this means the adhesive is kept at uniform consistency, suitable for application at all times, even after considerable lapse of time between wrapper length preparations.

The operation of the various mechanisms of the apparatus have been described in detail herein and it is deemed unnecessary to recapitulate the operation of the apparatus as a whole.

The imparting of continuous rotation to the glue applicator rolls 40, 86 and 102 constitutes an important feature. This serves to prevent the formation of a cake of dry glue on the rolls, which would happen if the rolls were permitted to stand idle for even a short interval, such as a five minute wait for cans to be wrapped. It also tends to maintain a uniform mixture, in respect to viscosity, during use, and when fresh glue is added to replenish the supply it helps to mix it with that remaining in the pot, and provide a uniform mixture.

By reason of the provision of the draw rolls 5, 6 and the control devices 16, 20 providing for the slack loop C of Figures 17 and 17A the feed roll means 61, 63 is never called upon to draw the web directly from the supply roll A, or in other words is never called upon to overcome the inertia of the heavy paper supply roll. The feed roll means 61, 63 draws the paper web W from the slack loop C and in so doing brings about a lifting of the weight or spool 16. Each time the weight 16 is lowered onto the switch actuator 17 it conditions the circuit through the conductors 226, 227 to bring about a silencing of the draw roll means 5, 6.

Each time the slack loop is shortened by drawing of paper web from the loop by the roll means 61, 63, resulting in a lifting of the weight 16 off the switch actuator 17, the circuit through the conductors 226, 227 is conditioned to bring about an activation of the roll means 5, 6 and a drawing of paper web into the slack loop from the supply roll A. Thus the draw roll means 5, 6 is controlled by the switch 20 actuated by the weight 16 and it is lifted and lowered by the slack loop C so as to be silenced and discontinue the drawing off of the web from the roll A each time the loop reaches a predetermined length and for again rendering said draw roll means effective to draw off additional web from the roll A each time the loop becomes shorter than said predetermined length.

If desired, a control means may be provided supplementary to the slide switch means H of Figures 1, 7 and 17 and effective to take over the control functions of said switch means should the latter fail for any reason. This control means can take the form of a normally open switch 252 connected by conductor lines 253 and 254 with the conductor lines 219 and 220 in the manner diagrammatically illustrated in Figure 17. Obviously the weight or spool 16 will be lifted a definite distance during each wrapper length feeding, and the switch 252 will be positioned just above the point at which it would be contacted and closed by said weight during the normal feeding of a wrapper length under control of the normally operating switch means. Thus the switch 252 would not be actuated during normal operation of the web feeding and severing means under control of the switch means H, but should said switch means H fail for any reason, the weight 16 would be lifted high enough to actuate the switch 252 so as to take over the controlling of the circuit through the conductors 219 as a full substitute for the switch means H. In other words, the switch 252 would act upon failure of the switch means H to prevent continuous feeding of the web W and to reestablish the controls formerly maintained by the switch means H. The switch 252 would be adjustably mounted in the same manner as the switch means H and for like purposes.

It will be apparent by reference to Figure 5 of the drawing that the glue applicator roll 102 against which the trailing end of a wrapper length is pressed by the member 106 to apply the transverse glue stripe is cut short at the end thereof adjacent the position of the rip strip 45, said shortened end being spaced in the axial direction inwardly of the position of the side stripe applicator roll 86 at the same side. This relation of the applicator rolls 86 and 102 is such that a clear space will be left between the end of the applied transverse glue stripe 250 and the adjacent applied side stripe 249, in which space the rip strip 45 is located. See Figure 13. In this manner, when a package of cans is wrapped as shown in Figure 14, the rip strip will not be adhered in the side seam, and a person seeking to open the package can easily insert a finger under the end extremity of the rip strip indicated at 45 in Figure 14 and start the tearing out of the strip which will result in separation of the whole base or bottom of the package and permit a telescoping away of the main body of the wrapper. It will be readily understood that the roll 102 may bear the same stated relation to the applicator roll 86 at its other end to provide a free non-glued space at the position of the reinforcing strip 48, if desired, or the longitudinal and transverse glue stripes may be overlapped at this side as shown in Figure 13.

A sample wrapper is shown in Figure 13, and on it the side or marginal edge glue striping is indicated at 249 and the transverse or trailing edge glue striping is indicated at 250.

A completed can package is shown in Figure 14, and in the detailed Figures 15 and 16 the reinforcing tape 48 and the tear strip 45 are shown. As previously explained, the upright portion only of the reinforcing tape 48 is adhered to the wrapper, the bent over or horizontal portion is not adhered and is free to slide relative to the wrapper as it is being bent over the can flanges as shown. This is made possible by applying the glue strip so that it will be covered by and cause adhesion of only half of the tape width.

While an example form of the apparatus has been disclosed herein it is to be understood that parts of the apparatus may be variously constructed and arranged without departing from the spirit and scope of the invention as defined in the appended claims.

I claim:

1. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, and means for applying a glue stripe along the trailing transverse edge of each said wrapper length while it is being fed in the direction of the length of said marginal glue stripes thereon.

2. In apparatus of the character described, means for drawing wrapper lengths from a continuous rolled web of paper, means for applying glue stripes along the marginal edges of the paper, means for cutting the paper thus drawn and glued into wrapper lengths, and means for applying a glue stripe along the trailing transverse edge of each said wrapper length, said marginal and trailing edge stripe applying means being operable during travelling of the paper web in a single direction in the applying of said glue stripes thereon.

3. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and means for feeding the cut and glued wrappers into position for being sealed as a packaging means about assembled groupings of cans.

4. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and means for varying at will the lengths of the wrappers glued and cut in the apparatus.

5. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and means for varying at will the lengths of the wrappers glued and cut in the apparatus merely by varying the timing of the cutting means with relation to the paper web drawing means and without any adjustment of the cutting means or the glue striping means.

6. Apparatus as defined in claim 4 in which the wrapper length varying means comprises cutting means controlling devices including an electric switch, a paper web punching means for punching holes in the web which are a predetermined definite distance from the web cutting means and which are effective to control operation of said switch, and means for varying the spaced relation of said switch and punching means.

7. Apparatus as defined in claim 4 in which the wrapper length varying means comprises cutting means controlling devices including an electric switch, and a paper web punching means for punching holes in the web which are a predetermined definite distance from the web cutting means and which are effective to control operation of said switch, means independently supporting the switch intermediately of the punching means and the cutting means, said switch being adjustable along its supporting means so as to be placeable at variable distances from and between the web cutting means and the web punching means.

8. Apparatus as defined in claim 1 in which the web is presented to the cutting means by separable feed rolls, and in which is included means movable with the cutting means for bringing about a separation of said feed rolls and a stopping of the web just prior to each cutting of a wrapper length therefrom.

9. Apparatus as defined in claim 1 in which the web is presented to the cutting means by separable feed rolls, and in which means is included for bringing about a separation of said feed rolls and a stopping of the web just prior to each cutting of a wrapper length therefrom, said cutting means and said roll separating means being controlled by a common means and actuated by devices relatively timed to cause the roll separation to slightly precede the web cutting action.

10. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and means for attaching a tear strip to the web prior to the cutting thereof into wrapper lengths and adjacent to and parallel one of the marginal glue stripes in position for being used in tearing open a wrapped package of cans.

11. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and means for attaching a reinforcing strip to the web prior to the cutting thereof into wrapper lengths and placing said strip adjacent to and parallel one of the marginal glue stripes in position for being bent over the flanges of cans at one end of the package when the wrapper is sealed about a can grouping, thereby to assure that the can flanges will not cut through the wrapper.

12. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and means for attaching a reinforcing strip to the web prior to the cutting thereof into wrapper lengths and placing said strip adjacent to and parallel one of the marginal glue stripes in position for being bent over the flanges of cans at one end of the package when the wrapper is sealed about a can grouping, thereby to assure that the can flanges will not cut through the wrapper, said strip attaching means being effective to adhere a portion only of the width of the strip to the web so that when said strip is bent over the can flanges the non-adhered portion of the strip can slip freely relative to the wrapper during such bending.

13. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and means for attaching a reinforcing strip to the web prior to the cutting thereof into wrapper lengths and placing said strip adjacent to and parallel one of the marginal glue stripes in position for being bent over the flanges of cans at one end of the package when the wrapper is sealed about a can grouping, thereby to assure that the can flanges will not cut through the wrapper, means also being provided for attaching a tear strip to the web prior to the cutting thereof into wrapper lengths and adjacent to and parallel the other marginal glue stripe in position for being used in tearing open a wrapped package of cans.

14. In apparatus of the character described, paper web feeding means, means for applying a stripe of an adhesive on the travelling web, guide roll means over which the web passes and disposed close to but out of contact with the glue stripe applying means and presser roll means much smaller than the guide roll means and disposed between the guide roll means and the glue stripe applying means but out of contact with the latter and effective for pressing a tape onto the applied stripe of adhesive at a point close to said stripe applying means to cause the strip to adhere to the web, the particular placement of the strip attaching pressure bearing such relation to the glue stripe applying means as to assure that there will be only a short length of uncovered adhesive on the web in advance of the applied strip that can harden upon stoppage of the web feeding and interfere with resumption of the strip attaching function as the web feeding is resumed.

15. Apparatus as defined in claim 14 in which the adhesive applying means includes an applicator roll, there being included also means for holding the paper web in arcuate contact against the applicator roll over only a short peripheral segment thereof immediately in advance of the guide roll and the presser roll means and while the web is being fed, and means for moving the holding means away each time the web feeding is discontinued.

16. In apparatus of the character described, means for longitudinally feeding a paper web, means for applying glue stripes along the marginal edges of the web as it is being fed longitudinally, means for cutting the web into predetermined uniform wrapper lengths, and means engageable simultaneously across the full width of each said wrapper length for applying a transverse glue stripe along the trailing edge of each said wrapper length as it is being fed longitudinally, said cutting means including web shearing means, and shearing means actuating devices controlled by actuation of a control switch, said web having switch actuator holes therein engageable with the switch for actuating the same and spaced for determining the length of the individual wrappers.

17. In apparatus of the character described, means for longitudinally feeding a paper web, means for applying glue stripes along the marginal edges of the web as it is being fed longitudinally, means for cutting the web into predetermined uniform wrapper lengths, and means for applying a transverse glue stripe along the trailing transverse edge of each said wrapper length as it is being fed longitudinally, said cutting means including web shearing means, and shearing means actuating devices controlled by actuation of a control switch, said web having switch actuator holes therein engageable with the switch for actuating the same and spaced for determining the length of the individual wrappers, and said holes being placed in marginal edge portions of the web so that they will be placed in adhered portions in the final sealing of a wrapper in the formation of a can package.

18. Apparatus as defined in claim 16 in which there is included means for stopping the feeding of the web just prior to the cutting of each wrapper length therefrom, and means for forming the switch actuator holes in the web while the same is stationary incidental to the cutting of each wrapper length.

19. Apparatus as defined in claim 16 in which the means for applying the marginal glue stripes includes an applicator roll and guide roll means placed above and below and opposite said applicator roll and to one side thereof with relation to the direction of feeding of the web so as to be effective to hold the paper web in arcuate contact with the applicator roll and yet be out of position for contacting the applicator roll when each wrapper length trailing edge moves clear of said applicator roll.

20. In apparatus of the character described, means for feeding a web of paper and including upper and lower sets of feed rolls, means between said sets of rolls for applying glue stripes along the marginal edges of the paper, means above said marginal edge applying means and below the upper roll set for cutting the web into wrapper lengths, means below said marginal edge applying means and above the lower roll set for applying a glue stripe along the trailing transverse edge of each said wrapper length, and guide means disposed between said upper and lower roll sets and effective for guiding the leading edge of the web and the trailing edge of a wrapper length cut therefrom at and beyond the location of the cutting means.

21. Apparatus as defined in claim 20 in which the guiding means includes a vertically shiftable plate, and wherein are included means for controlling the position of said plate to place the same in web guiding position while the web is being fed past the cutting means, and for moving the plate out of the way when the cutting means is functioning to cut the web.

22. Apparatus as defined in claim 20 in which the guiding means includes a vertically shiftable plate, and wherein are included means for controlling the position of said plate to place the same in web guiding position while the web is being fed past the cutting means, and for moving the plate out of the way when the cutting means is functioning to cut the web, means also being included for discontinuing the feeding of the web during the cutting of each wrapper length therefrom.

23. In apparatus of the character described, means for feeding a web of paper, means for applying glue stripes along the marginal edges of the paper, means for cutting the web into wrapper lengths, and means for applying a glue stripe along the trailing transverse edge of said wrapper length, said last named means including an applicator roll placed out of contacting relation to the travelling paper web, and a presser member movable in timed relation to the travelling paper to press the trailing edge of a cut wrapper length momentarily against said roll while it is moving therepast.

24. In apparatus of the character described, means for feeding a web of paper, means for applying glue stripes along the marginal edges of the paper, means for cutting the web into wrapper lengths, and means for applying a glue stripe along the trailing transverse edge of said wrapper length, said last named means including an applicator roll placed out of contacting relation to the travelling paper web, a presser member movable in timed relation to the travelling paper to press the trailing edge of a cut wrapper length momentarily against said roll while it is moving therepast, and control means for shifting said presser member to and from its wrapper length end contacting and releasing positions including a control switch means controlled by said wrapper length end as it is approaching the applicator roll, and a second control switch means controlled by said wrapper length end as it is moving away from said applicator roll.

25. In apparatus of the character described, means for feeding a web of paper and including upper and lower sets of feed rolls, means between said sets of rolls for applying glue stripes along the marginal edges of the paper, means above said marginal edge applying means and below the upper roll set for cutting the web into wrapper lengths, means below said marginal edge applying means and above the lower roll set for applying a glue stripe along the trailing transverse edge of each said wrapper length, and guide means disposed bewteen said upper and lower roll sets and effective for guiding the leading edge of the web and the trailing edge of a wrapper length cut therefrom at and beyond the location of the cutting means, means also being provided for separating the rolls of said upper and lower sets during the cutting of each wrapper length so as to allow the paper web to remain stationary during each web length cutting, the rolls of the lower set being separable only momentarily and one thereof having a circumferentially serrated periphery engageable by each glue trailing edge of a wrapper as it is passing through said lower rolls after they have been returned to their normal feeding relation.

26. In apparatus of the character described, wherein is provided means for forming can wrappers from a continuous rolled web of paper, and including means for applying longitudinal glue stripes on the web while it is being fed longitudinally, means for applying transverse glue stripes at wrapper lengths while the wrapper lengths are being fed longitudinally, means for cutting the web into wrapper lengths, means for actuating the cutting means and including devices for separating the continuously driven feed rolls each time the cutting means is moved to cut the web, means including continuously driven feed rolls means for feeding the web through said gluing and cutting means, means for controlling the drawing off of the paper web from the roll in the form of a slack loop and including guide means between which the loop is suspended, draw roll means for drawing the web from the roll and into the loop, free weight means suspended in the loop, and control means for said draw roll means including a control switch actuated by said weight means as it is lifted and lowered by the loop and effective for silencing the draw roll means and discontinuing the drawing off of the web from the roll each time the loop reaches a predetermined length and for again rendering the draw rolls effective to draw off additional web from the roll each time the loop becomes shorter than said predetermined length, said feed roll means receiving the web from the slack loop so that the feed roll means will never be called upon to overcome the inertia of the paper roll in feeding the web.

27. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and rigid U-shaped means for receiving each glued and cut wrapper length with the leading end thereof moving downwardly and effective to turn said leading end upwardly for shaping the wrapper length partially about a grouping of cans with a free loop depending below the can grouping and so that an operator can with facility grasp the trailing end of the wrapper length and draw it over the can grouping and into lapped relation to the leading end to complete the wrapping and sealing of the wrapper about said can grouping.

28. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and rigid U-shaped means for receiving each glued and cut wrapper length with the leading end thereof moving downwardly and effective to turn said leading end upwardly for shaping the wrapper length partially about a grouping of cans with a free loop depending below the can grouping and so that an operator can with facility grasp the trailing end of the wrapper length and draw it over the can grouping and into lapped relation to the leading end to complete the wrapping and sealing of the wrapper about said can grouping, said wrapper length receiving and shaping means including means for gripping the leading edge of a wrapper while the operator is grasping the trailing edge of the wrapper and drawing it over the grouping of cans and sealing it against said leading edge.

29. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, means for applying a glue stripe along the trailing transverse edge of each said wrapper length while it is being fed in the direction of the length of said marginal glue stripes thereon, and rigid U-shaped means for receiving each glued and cut wrapper length with the leading end thereof moving downwardly and effective to turn said leading end upwardly for shaping the wrapper length partially about a grouping of cans with a free loop depending below the can grouping and so that an operator can with facility grasp the trailing end of the wrapper length and draw it over the can grouping and into lapped relation to the leading end to complete the wrapping and sealing of the wrapper about said can grouping, said wrapper length receiving and shaping means including means for gripping the leading edge of a wrapper while the operator is grasping the trailing edge of the wrapper and drawing it over the grouping of cans and sealing it against said leading edge, stationary and movable supports uprightly disposed and against which the trailing end of each wrapper may rest, and means for moving the movable supports toward and then away from a can grouping to facilitate the grasping of the trailing end of each wrapper by an operator.

30. Apparatus as defined in claim 1 in which the web is presented to the cutting means by separable feed rolls and in which is included means movable with the cutting means for bringing about a separation of said feed rolls just prior to each cutting of a wrapper length therefrom, brake roll means independent of the feed rolls and also being disposed in advance of said feed rolls and engaging said web to hold the same stationary while the feed rolls are separated.

31. Apparatus as defined in claim 26 in which the feed roll means includes separable feed rolls which receive the web from the slack loop indirectly through brake roll means, means being included for separating the feed rolls just prior to the cutting of each wrapper length from the web, and said brake roll means being effective to hold the web stationary while the feed rolls are separated.

32. Apparatus as defined in claim 29 in which the movable supports press the trailing end of a wrapper against the grouping of cans in position to facilitate grasping of said trailing end by the operator, means also being provided and operable by the operator for easing the movable supports away from their wrapper end pressing position after the operator has grasped the wrapper end, thereby to free the wrapper end so that the operator can draw it over the grouping of cans.

33. In apparatus of the character described, means for feeding a web of paper in upright position, means movable horizontally across the web of paper for cutting wrapper lengths from the web, means for applying glue stripping to the paper, vertically shiftable guide means normally placed oposite and across the cutting means for guiding the paper past the cutting means toward the glue applying means, means for operating the cutting means, and means for shifting the guide means in timed relation to the cutting means operation to bring about a displacement of the guide means while the cutting means is severing a wrapper length and for placing the guide means in paper guiding position while the paper is moving toward the glue applying means.

34. In apparatus of the character described, means for drawing wrapper lengths from a continuous rolled web of paper, means for applying glue stripes along the marginal edges of the paper while the wrapper lengths are being fed longitudinally, means for cutting the paper thus drawn and glued into wrapper lengths, and means for applying a glue stripe along the trailing transverse edge of each said wrapper length while it is being fed in the direction of the length of said marginal glue stripes thereon, said marginal and trailing edge stripe applying means including constantly rotated pickup and applicator roll means operable during travelling of the paper web in the applying of said glue stripes thereon.

35. In apparatus of the character described, means for drawing wrapper lengths from a continuous rolled web of paper, means for applying glue stripes along the marginal edges of the paper, means for cutting the paper thus drawn and glued into wrapper lengths, means for applying a glue stripe along the trailing transverse edge of each said wrapper length, and means for attaching a tear strip to the web paralleling and adjacent one of the marginal glue stripes prior to the cutting of the web into wrapper lengths, said transverse glue stripe applying means including an applicator roll having an end disposed to terminate the transverse glue stripe application in spaced relation from the marginal stripe beside which the tear strip is applied so as to place the end of the tear strip when a given wrapper length is severed in an unglued space between said marginal and transverse stripe ends.

36. In apparatus of the character described, wherein is provided means for forming can wrappers from a continuous rolled web of paper, and including means for applying longitudinal glue stripes on the web, means for applying transverse glue stripes at wrapper lengths, and means for cutting the web into wrapper lengths; means for controlling the drawing off of the paper web from the roll in the form of a slack loop and including guide means between which the loop is suspended, draw roll means for drawing the web from the roll and into the loop, free weight means suspended in the loop, control means for said draw roll means including a control switch actuated by said weight means as it is lifted and lowered by the loop and effective for silencing the draw roll means and discontinuing the drawing off of the web from the roll each time the loop reaches a predetermined length and for again rendering the draw rolls effective to draw off additional web from the roll each time the loop becomes shorter than said predetermined length, said cutting means including web shearing means, and shearing means actuating devices controlled by actuation of a control switch, said web having switch actuator holes herein engageable with the switch for actuating the same and spaced for determining the length of the individual wrappers, and supplementary control means for taking over the control effected by said last named control switch upon any failure thereof and including a control switch operable incidental to a lifting of the free weight means to a predetermined height.

References Cited in the file of this patent

UNITED STATES PATENTS

| | | |
|---|---|---|
| 736,783 | Robinson et al. | Aug. 18, 1903 |
| 1,056,164 | Gibson | Mar. 18, 1913 |
| 1,435,979 | Reed | Nov. 21, 1922 |
| 1,586,719 | Swab | June 1, 1926 |
| 1,691,027 | Novick | Nov. 6, 1928 |
| 1,757,204 | Magill | May 6, 1930 |
| 1,799,072 | Steen | Mar. 31, 1931 |
| 1,813,869 | Templeton et al. | July 7, 1931 |
| 2,092,177 | McClay | Sept. 7, 1937 |
| 2,131,748 | Novick | Oct. 4, 1938 |
| 2,166,946 | Eberling | July 25, 1939 |
| 2,171,172 | Chalmers | Aug. 29, 1939 |
| 2,237,327 | Bell | Apr. 8, 1941 |
| 2,246,969 | Antrim | June 24, 1941 |
| 2,336,795 | Malhiot | Dec. 14, 1943 |
| 2,346,194 | Sjostrom | Apr. 11, 1944 |
| 2,350,244 | Malhiot | May 30, 1944 |
| 2,430,281 | Eaton et al. | Nov. 4, 1947 |
| 2,536,675 | Bergstein | Jan. 2, 1951 |

FOREIGN PATENTS

| | | |
|---|---|---|
| 828,031 | France | Feb. 2, 1938 |